Figure 1:
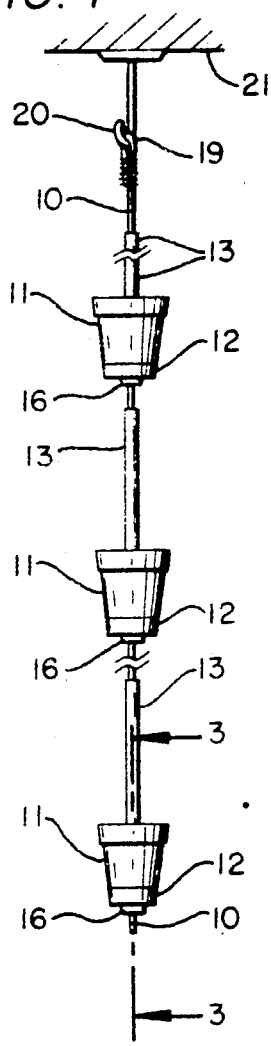

United States Patent [19]

Sharon et al.

[11] Patent Number: 5,052,148
[45] Date of Patent: Oct. 1, 1991

[54] HANGING ROPE MOUNTED ADJUSTABLE POSITION PLANT POT

[76] Inventors: Arie N. Sharon, 1322 N. Park Dr., Richardson, Tex. 75081; Lori L. Hendricks, 1602 Rich Rd., Rockwell, Tex. 75087

[21] Appl. No.: 573,807
[22] Filed: Aug. 28, 1990
[51] Int. Cl.⁵ ............................................. A01G 9/02
[52] U.S. Cl. ......................................... 47/67; 248/328
[58] Field of Search .................. 47/66, 67, 68, 83, 71, 47/70, 82; 248/318, 327, 328

[56] References Cited

U.S. PATENT DOCUMENTS

| | | | |
|---|---|---|---|
| D. 20,355 | 11/1890 | Whilldin. | |
| 207,083 | 7/1878 | Tennyson. | |
| 3,030,735 | 4/1962 | Bodkins | 47/83 |
| 4,102,081 | 7/1978 | Morrow | 47/83 |
| 4,227,343 | 10/1980 | Espy et al. | 248/318 |
| 4,449,324 | 5/1984 | Ostarly | 47/67 |
| 4,561,208 | 12/1985 | Schultz | 47/67 |
| 4,635,394 | 1/1987 | Brown | 47/67 |

*Primary Examiner*—David A. Scherbel
*Assistant Examiner*—Michele A. Van Patten
*Attorney, Agent, or Firm*—Warren H. Kintzinger

[57] ABSTRACT

A plant container is in the form of a plant pot (flower pot) having a bottom with a center opening and several water drain openings with the bottom receivable in a circular pot tray formed with a center tubular pole that extends upward through the bottom center opening of the pot. An overhead suspended rope is passed through the center tubular pole and an adjustable position pot stopper with a position locking screw positioning the plant pot on the hanging rope.

15 Claims, 2 Drawing Sheets

U.S. Patent    Oct. 1, 1991    Sheet 1 of 2    5,052,148

HANGING ROPE MOUNTED ADJUSTABLE POSITION PLANT POT

This invention relates in general to hanging plant pots, and more particularly, to a hanging rope mounted adjustable position plant pot where the rope is passed through a tube pole member extended through the plant pot from a pot tray to above the plant pot and with an adjustable position pot-stopper on the rope below the pot tray.

There are many hanging baskets and other containers for plants extensively used today within homes and buildings and also outside with support of the plant from a ceiling inside, a porch overhead or a tree limb outside. Such plant hang mountings are an effective showy way of displaying plant life and lend themselves to the effective decoration of an area. Some of these plant pot hangings, particularly three rope hangings, have a disadvantage in that watering of the plant is many times difficult at best. Vertical orientation of a plant pot is important and stabilization to such upright orientation should be provided.

It is therefore a principal object of this invention to provide a rope (or cord) hanging suspension for plant pots inherently stable in maintaining upright orientation.

Another object is to provide such a suspension that is safe to use.

A further object is to provide such a suspension that is of clean economical construction.

Still another object is to provide a plant pot suspension that enhances the appearance of plant life displayed and that enhances the decorative aspects of the host environment.

Features of the invention useful in accomplishing the above objects include, in a hanging rope mounted adjustable position plant pot, a plant container in the form of a plant pot(flower pot) having a bottom with a center opening and several water drain openings with the bottom receivable in a circular pot tray formed with a center tubular pole that extends upward through the bottom center opening of the pot. An overhead suspended rope is passed through the center tubular pole and an adjustable position pot stopper, with a position locking screw, positioning the plant pot on the hanging rope. More than one pot may be positioned at different levels on the same rope each individually positioned by the adjustable position pot stopper for that pot.

A specific embodiment representing what is presently regarded as the best mode of carrying out the invention is illustrated in the accompanying drawing.

Figure 2A:
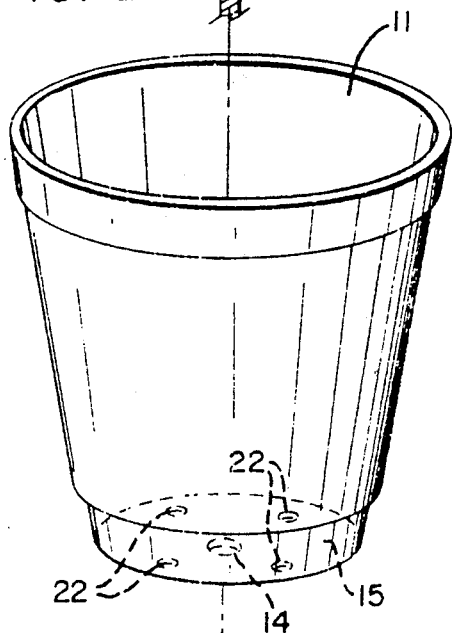
Figure 2B:
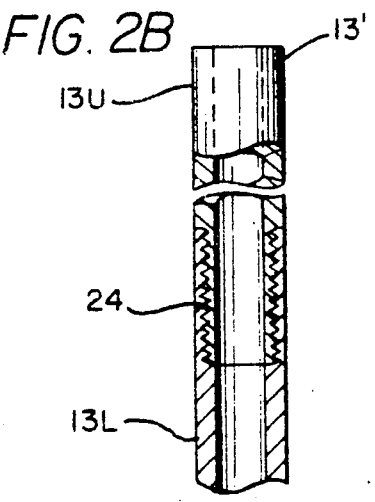
Figure 2B:
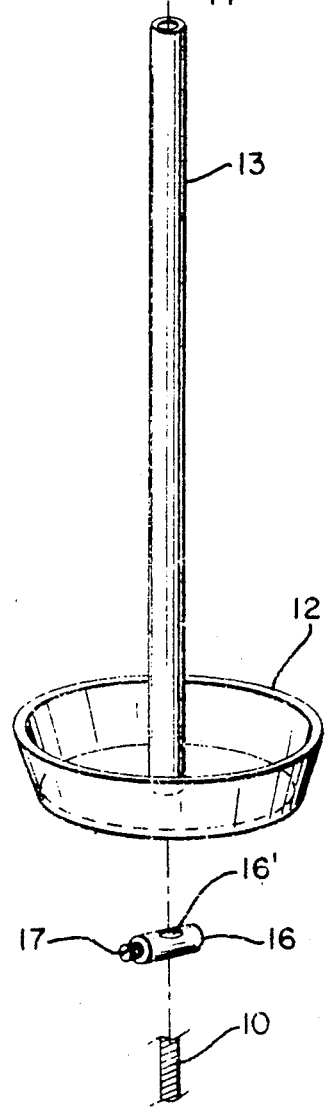
Figure 3:
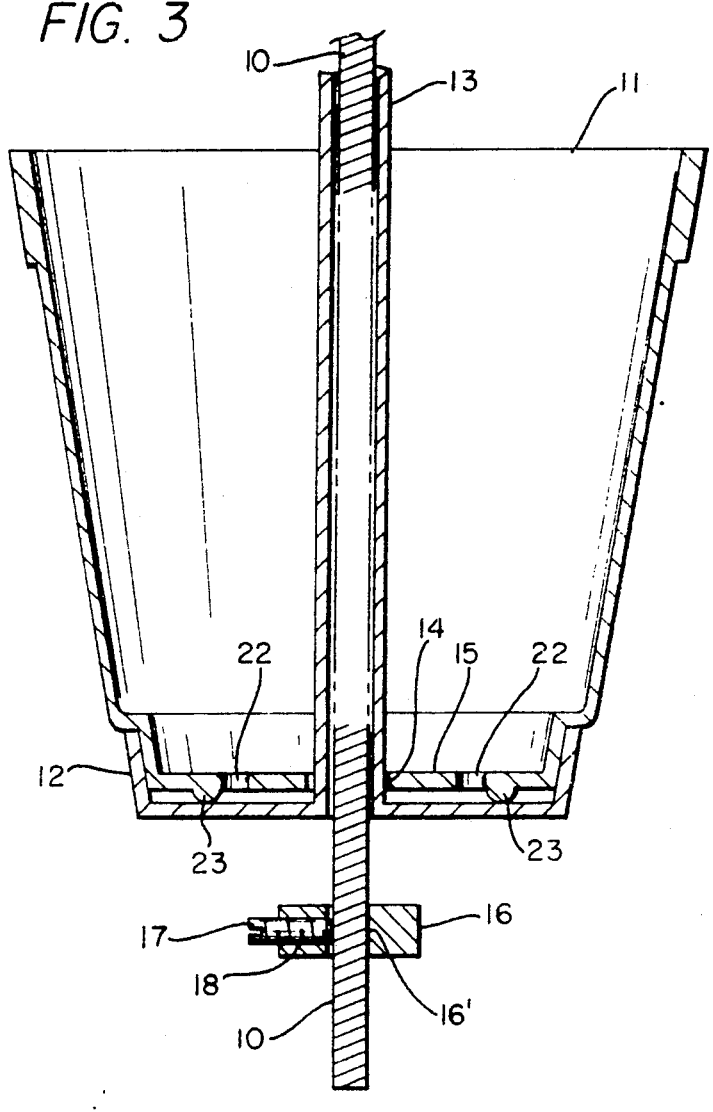
Figure 4:
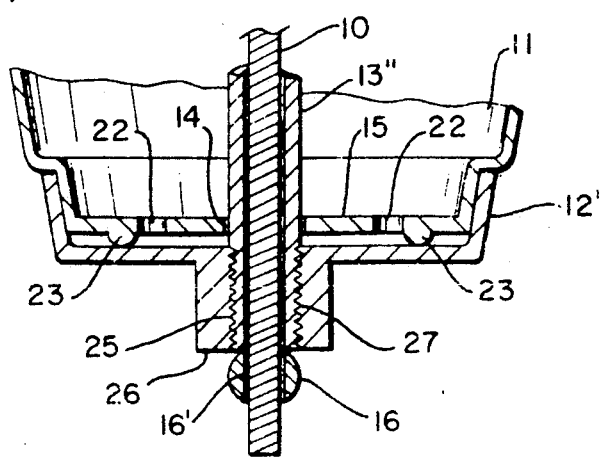

In the drawing:

FIG. 1 represents a side elevation view of the hanging rope mounted adjustable position plant pot with a plurality of the adjustable position pots at various heights on the hanging rope;

FIG. 2A, an exploded perspective view of a plant pot, pot tray with hollow center pole (tube) and the adjustable position pot stopper with the rope engaging position locking screw beneath the pot tray;

FIG. 2B, a partial view of a two section threaded together hollow center pole;

FIG. 3, a broken away and sectioned side elevation view of a pot and pot tray mounted on a hanging rope; and, FIG. 4, a partial broken away and sectioned side elevation view of a pot and pot tray with the hollow center pole having a threaded connection with the pot tray.

Referring to the drawing:

The hanging rope 10 mounted adjustable plant pot 11 is shown to be held in a circular pot-tray 112 having a hollow center pole 13 as an upward extension therefrom. Referring to FIGS. 1-4 the hollow center pole 13 extends upward from pot-tray 12 through opening 14 in the bottom 15 of plant pot 11 entirely through the height of the pot 11. Pole 13 extends sufficiently beyond the top of plant 11 to derive upright holding stability for the hollow center pole 13, the pot-tray 12 and the plant pot 11 held thereby from the hanging rope 10 passed therethrough and on down to and through an adjustable pot stopper 16 having rope engaging position locking screw 17 threaded into threaded opening 18 in the pot stopper 16 with the rope 10 extended through stopper hole 16'.

Hanging rope 10 is shown to have a top end loop 19 that is fitted to a hook 20 fastened to a ceiling 21 by any conventional method (detail not shown). One plant pot 11 may be mounted on a hanging rope 10 or a plurality of pot plants 11 may be mounted at different height levels, as shown in FIG. 1. The bottom 15 of plant pot 11 is shown to have water drain openings 22 and also stand off bottom projections 23 to insure space within the pot-tray 12 for water.

With the hollow center pole 13' of FIG. 2B the pole 13' is a two section pole with the two sections 13U and 13L having a male and female threaded together connection 24. The pot-tray 12' embodiment of FIG. 4 has an internally threaded 25 downwardly extended boss 26 into which the bottom threaded end 27 of hollow center pole 13" is a watertight threaded fit. An upwardly extended internally threaded boss counterpart to boss 26 extended up through an enlarged opening 14 could be employed in yet another embodiment to that of FIG. 4. Thus, there are provided in these various hanging rope mounted adjustable position plant pot suspension embodiments, with the rope passed through a center tubular pole extended through each plant pot and thereabove, a stable upright maintaining mounting for pots. Furthermore, the tubular pole with the rope passed through the center is a convenience in watering the plants in the pot and the adjustable position pot stopper on the rope may be easily locked in position where desired for esthetic purposes and for care convenience.

It should be noted that the center tubular pole 13 and the pot tray 12 when formed together of the same material would be either plastic or metal. When the center tubular pole 13 is fastened to the pot tray 12 by such as a threaded or press fit connection while the pot tray 12 could be ceramic, plastic or metal the center tubular pole would be limited to being plastic or metal.

Whereas this invention has been described with respect to several embodiments thereof, it should be realized that various changes may be made without departure from the essential contributions to the art made by the teachings hereof.

I claim:

1. A single hanging rope mounted adjustable height position plant pot comprising: a plant pot with a bottom having a center opening received and supported in a pot tray; a center tubular pole connected to said pot tray and extended upward through said center opening to a location above the top of said plant pot and resting on said pot tray; the through opening of said center tubular pole sized for and receiving passage therethrough a hanging rope to mount said plant; and adjustable position locking means mounted on and lockable to said hanging rope below said pot tray for supporting said pot tray and said plant pot at a desired height level on said single hanging rope.

2. The single hanging rope mounted adjustable height position plant pot of claim 1, wherein said adjustable position locking means has an opening with said hanging rope passing therethrough and a tightening member mounted in said adjustable position locking means positioned for movement into position locking engagement with said hanging rope.

3. The single hanging rope mounted adjustable height position plant pot of claim 2, wherein said tightening member is a screw in said adjustable position locking means tightenable into locking engagement with said hanging rope.

4. The single hanging rope mounted adjustable height position plant pot of claim 2, wherein the center tubular pole that extends upward through the bottom center opening of the plant pot is formed integrally with said pot tray.

5. The single hanging rope mounted adjustable height position plant pot of claim 4, wherein said pot tray is a circular pot tray formed to receive and support the bottom of a plant pot carried thereby.

6. The single hanging rope mounted adjustable height position plant pot of claim 2, wherein the center tubular pole that extends upward through the bottom center opening of the plant pot is fastened to said pot tray.

7. The single hanging rope mounted adjustable height position plant pot of claim 6, wherein the fastening of said center tubular pole to said pot tray is a threaded connection.

8. The single hanging rope mounted adjustable height position plant pot plant pot of claim 7, wherein said threaded connection of said center tubular pole is a water tight threaded connection in a boss extension from said pot tray.

9. The single hanging rope mounted adjustable height position plant pot of claim 8, wherein said center tubular pole and said pot tray are different materials.

10. The single hanging rope mounted adjustable height position plant pot of claim 9, wherein said center tbular pole is a stiff non ceramic type material; and said pot tray is a ceramic pot tray.

11. The single hanging rope mounted adjustable height position plant pot of claim 10, wherein said center tubular pole is plastic.

12. The single hanging rope mounted adjustable height position plant pot of claim 10, wherein said center tubular pole is metal.

13. The single hanging rope mounted adjustable height position plant pot of claim 6, wherein said center tubular pole is a multi-section tubular pole with the multi-sections rigidly fastened together.

14. The single hanging rope mounted adjustable height position plant pot of claim 6, wherein said center tubular pole is a two section tubular pole with a threaded connection between the two tubular pole sections.

15. The single hanging rope mounted adjustable height position plant pot of claim 6, wherein a plurality of said adjustable height position plant pots are mounted at different heights on the same hanging rope.

* * * * *